United States Patent
Norrman et al.

(10) Patent No.: US 8,903,095 B2
(45) Date of Patent: Dec. 2, 2014

(54) METHODS AND APPARATUSES FOR AVOIDING DAMAGE IN NETWORK ATTACKS

(75) Inventors: Karl Norrman, Stockholm (SE); John Mattsson, Täby (SE); Vesa Petteri Lehtovirta, Espoo (FI); Okcar Ohlsson, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/177,385

(22) Filed: Jul. 6, 2011

(65) Prior Publication Data
US 2012/0254997 A1   Oct. 4, 2012

Related U.S. Application Data

(60) Provisional application No. 61/470,709, filed on Apr. 1, 2011.

(51) Int. Cl.
| | | |
|---|---|---|
| *H04L 29/06* | (2006.01) | |
| *H04W 12/04* | (2009.01) | |
| *H04L 29/08* | (2006.01) | |

(52) U.S. Cl.
CPC ......... *H04W 12/04* (2013.01); *H04L 2463/061* (2013.01); *H04L 63/168* (2013.01); *H04L 67/02* (2013.01); *H04L 67/14* (2013.01); *H04L 63/1466* (2013.01)
USPC ................................ 380/281; 726/7; 713/168

(58) Field of Classification Search
None
See application file for complete search history.

(56) References Cited

U.S. PATENT DOCUMENTS

| | | | | |
|---|---|---|---|---|
| 6,615,353 | B1 * | 9/2003 | Hashiguchi | 713/185 |
| 7,628,322 | B2 * | 12/2009 | Holtmanns et al. | 235/380 |
| 7,885,640 | B2 * | 2/2011 | Holtmanns et al. | 455/411 |
| 7,987,509 | B2 * | 7/2011 | Feigenbaum et al. | 726/26 |
| 8,346,943 | B2 * | 1/2013 | Murakami et al. | 709/227 |
| 8,509,431 | B2 * | 8/2013 | Schmidt et al. | 380/44 |

(Continued)

FOREIGN PATENT DOCUMENTS

| | | | |
|---|---|---|---|
| JP | 2004355471 A | 12/2004 | |
| WO | WO 2007008120 A1 * | 1/2007 | H04L 29/06 |
| WO | 2009106091 A1 | 9/2009 | |

OTHER PUBLICATIONS

Nokia Corporation et al., "GBA usage with Web Browser", 3GPP TSG-SA3 (Security), SA3#62, Jan. 24-28, 2011, Ljublijana, Slovenia, S3-110107.

(Continued)

*Primary Examiner* — Michael R Vaughan
(74) *Attorney, Agent, or Firm* — Coats & Bennett, PLLC

(57) ABSTRACT

Methods and apparatuses in a client terminal (400) and a web server (402) for enabling safe communication between said terminal and server. When the terminal obtains a web page from the server in a session, the terminal creates a context-specific key, Ks_NAF', based on one or more context parameters, P1, . . . Pn, pertaining to said session and/or web page. The terminal then indicates the context-specific key in a login request to the server, and the server determines a context-specific key, Ks_NAF', in the same manner to verify the client if the context-specific key determined in the web server matches the context-specific key received from the client terminal. The context-specific key is thus bound to and valid for the present context or session only and cannot be used in other contexts or sessions.

22 Claims, 4 Drawing Sheets

(56) References Cited

U.S. PATENT DOCUMENTS

| | | | |
|---|---|---|---|
| 8,533,803 B2* | 9/2013 | Cha et al. | 726/8 |
| 2002/0126850 A1* | 9/2002 | Allen et al. | 380/277 |
| 2005/0246548 A1* | 11/2005 | Laitinen | 713/182 |
| 2006/0174117 A1* | 8/2006 | Laitinen | 713/169 |
| 2006/0196931 A1* | 9/2006 | Holtmanns et al. | 235/380 |
| 2006/0236106 A1* | 10/2006 | Patel | 713/169 |
| 2007/0101122 A1* | 5/2007 | Guo | 713/153 |
| 2007/0118744 A1* | 5/2007 | Huang | 713/168 |
| 2007/0143614 A1* | 6/2007 | Holtmanns et al. | 713/171 |
| 2007/0234041 A1* | 10/2007 | Lakshmeshwar et al. | 713/156 |
| 2008/0216153 A1* | 9/2008 | Aaltonen et al. | 726/3 |
| 2009/0158032 A1* | 6/2009 | Costa et al. | 713/156 |
| 2009/0313689 A1* | 12/2009 | Nystrom et al. | 726/9 |
| 2010/0268937 A1* | 10/2010 | Blom et al. | 713/153 |
| 2010/0303242 A1* | 12/2010 | Holtmanns et al. | 380/278 |
| 2010/0332832 A1* | 12/2010 | Wu et al. | 713/169 |
| 2011/0167160 A1* | 7/2011 | Murakami et al. | 709/227 |
| 2011/0289315 A1* | 11/2011 | Laitinen et al. | 713/156 |
| 2011/0296181 A1* | 12/2011 | Barriga et al. | 713/168 |
| 2011/0302627 A1* | 12/2011 | Blom et al. | 726/2 |
| 2012/0072979 A1* | 3/2012 | Cha et al. | 726/7 |
| 2012/0204231 A1* | 8/2012 | Holtmanns et al. | 726/3 |
| 2012/0254959 A1* | 10/2012 | Schmidt et al. | 726/6 |
| 2013/0067552 A1* | 3/2013 | Hawkes et al. | 726/7 |

OTHER PUBLICATIONS

Ericsson, et al., "Security Enhancement for Usage of GBA from Browser", 3GPP TSG SA WG3 Security—SA3#63, Apr. 11-15, 2011, Chengdu, China P.R., SA WG3 Temporary Document, S3-110502.

* cited by examiner

METHODS AND APPARATUSES FOR AVOIDING DAMAGE IN NETWORK ATTACKS

RELATED APPLICATIONS

This application claims priority to U.S. Provisional Application No. 61/470,709, filed Apr. 1, 2011, entitled "Method and Arrangement for Limiting Damage in Network Attacks," which is incorporated herein by reference.

TECHNICAL FIELD

The present disclosure relates generally to methods and apparatuses for enabling safe communication between a client terminal and a web server, by avoiding damage that may otherwise occur when a security key is stolen from the client.

BACKGROUND

The so-called "Generic Bootstrapping Architecture" (GBA) is a technology standardized in the Third Generation Partnership Project (3GPP), that enables a client in a communications network to establish a shared secret key, e.g. denoted "Ks_NAF", with a Network Application Function (NAF) located in a web server connected to the network.

A typical usage of GBA is for client authentication. As many currently existing applications are web based, i.e. available on the public Internet or an intranet, client authentication is particularly interesting when performed from a browser used by the client. A typical scenario is that the client is a communication terminal equipped with a browser operated by a user. To allow GBA to be used together with Hyper Text Mark up Language (HTML) form based authentication—being a widely used authentication method on Internet—it has been proposed to add a JavaScript Application Program Interface (API) at the client for GBA in web based applications. The JavaScript API is then executed by the client's browser and can be regarded as a part thereof.

The JavaScript API may be used at the client according to the following actions 1:1-1:4:
Action 1:1. The browser at the client downloads a login page from a web server over "HTTPS", the latter referring to Hyper Text Transfer Protocol (HTTP) over Transport Layer Security (TLS) or Secure Socket Layer (SSL). The login page is a web page that contains an "HTML Form" with fields for "username" and "password".
Action 1:2. The downloaded web page also contains a piece of JavaScript, hereafter called "script" for short. The script obtains a parameter called "Bootstrapping Transaction Identity, B-TID" identifying the client. The script further obtains a shared secret key denoted "Ks_NAF", by calling the GBA JavaScript API provided by the client:
(B-TID, Ks_NAF)=window.document.getGBAKey( ).
The B-TID acts as a form of alias for an IMSI (International Mobile Subscriber Identity) of the client and the Ks_NAF is associated with the web server and possibly other web servers as well using the same NAF. The Ks_NAF is thus a key shared with the web server, which is used in Action 1:4 below. In the present Action 1:2, the JavaScript API returns Ks_NAF and B-TID to the script.
Action 1:3. The script populates the HTML Form with the obtained B-TID as the username and the obtained Ks_NAF as the password. The resulting HTML Form is then submitted from the client to the web server.
Action 1:4. The web server, i.e. the NAF, authenticates the client by validating the username and password. In more detail, the NAF retrieves the Ks_NAF used by the client from a Bootstrapping Server Function (BSF) associated with the client, by presenting the B-TID received from the client in Action 1:2 to the BSF. The BSF derives the Ks_NAF, from a key shared with the client referred to as the "master key, Ks". This is thus the same secret key the client obtained in Action 1:2. The Ks_NAF is unique for each NAF and Ks.

However, the existing proposal to add a JavaScript API at the client is vulnerable to so-called "script injection attacks". By finding ways of injecting malicious scripts into web pages, an attacker can gain elevated access privileges, or access, to sensitive page-content, cookies, and a variety of other information that may be maintained by the browser on behalf of the user. Whether a web page is susceptible to script injection in this way or not depends on its contents and the security mitigations implemented by the web server's owner, effectively being the page owner.

A problem with the proposal above has been identified in that the shared secret key Ks_NAF returned by the JavaScript API at the client in the procedure above has a very wide scope of usage. A key "stolen" by an attacker through script injection may remain valid and useful across an entire Domain Name System (DNS) type of domain, e.g. "naf.com", and across different HTTP sessions with the server(s) using that NAF.

To illustrate this, an example will be considered with a host "naf.com" which is a web server having two accessible webpages denoted "login.html" and "vulnerable.html". The first page login.html has been meticulously and thoroughly coded and is in itself invulnerable to any type of attack. The second page vulnerable.html, on the other hand, contains a subtle flaw which effectively makes it susceptible to code injection. Realizing this, an attacker injects the following "malicious" script into the second web page:
<SCRIPT type="text/javascript">
(B-TID, Ks_NAF)=window.document.getGBAKey( ).
... upload (B-TID, Ks_NAF) to attacker ...
</SCRIPT>
The next user who visits the second web page naf.com/vulnerable.html and obtains the shared key according to the above procedure, will unknowingly upload his obtained key to the attacker by means of the above malicious script injected into the second web page. As a result, the attacker can in turn use that key to login at naf.com/login.html and be properly authenticated.

In another example, a downloaded vulnerable HTML document is rendered in a client browser. The document contains a command that instructs the browser to download and execute a third party script which may be an advertisement, a visitor counter or other apparently harmless application. The third party script however also contains a line which retrieves the Ks_NAF and B-TID of the client, which is accordingly done when the script is executed. The script also adds a link to the rendered web page which is a command to upload the Ks_NAF and B-TID to the "evil" third party. Believing that the link is useful but harmless, the user clicks on the link and the upload is then executed. Thereby, the third party obtains the Ks_NAF and B-TID of the client for later illicit usage.

It is thus a problem that an attacker can get hold of sensitive information of a particular client such as a shared secret key, and use that information for fake authentication and verification in forthcoming sessions with web servers where that information is valid.

SUMMARY

It is an object of the invention to address at least some of the problems and issues outlined above. It is possible to achieve these objects and others by using methods and apparatuses as defined in the attached independent claims.

According to one aspect, a method is provided in a client terminal for enabling safe communication with a web server. In this method, the client terminal obtains a web page from the web server in a session with the web server, determines a set of context parameters, P1, . . . Pn, pertaining to said session and/or web page, and creates a context-specific key, Ks_NAF', based on the context parameters. The client terminal then uses the created context-specific key Ks_NAF' for verification of the client in the web server if a context-specific key determined in the web server matches the context-specific key created by the client terminal.

According to another aspect, a client terminal is configured to enable safe communication with a web server. The client terminal comprises a receiving module adapted to obtain a web page from the web server in a session with the web server, a key creating module adapted to determine a set of context parameters, P1, . . . Pn, pertaining to said session and/or web page, and to create a context-specific key, Ks_NAF', based on the context parameters, and a sending module adapted to send a login request indicating the created context-specific key Ks_NAF' to the web server. Thereby, verification of the client is enabled if a context-specific key determined in the web server matches the context-specific key created by the client terminal.

In this solution, the context-specific key is thus made context-specific to be useful for authentication or verification only in the present context and effectively useless, i.e. invalid, for authentication or verification in another context. Thereby, damage can be avoided in the case when the context-specific key is stolen in a network attack or the like.

The above method and client terminal may be configured and implemented according to different optional embodiments. In one possible embodiment, the created context-specific key Ks_NAF' is indicated in a login request to the web server. The context parameters may include at least one of: a path component of a Universal Resource Locator, URL, of the web page, a current HTTP session identity of the session, and a current Transport Layer Security, TLS/Secure Socket Layer, SSL, session identity of the session.

In another possible embodiment, the context-specific key Ks_NAF' is created by applying a predefined Key Derivation Function, KDF, to the context parameters, the Key Derivation Function being known to the web server. In this case, an aggregated parameter, S, may be created based on the context parameters P1, . . . Pn in a predetermined manner, and the Key Derivation Function may be applied using as input the aggregated parameter S and an application specific key, Ks_NAF, such that
Ks_NAF'=KDF(Ks_NAF, S(P1, . . . Pn)).

Further, the application specific key Ks_NAF may have been derived from a master key, Ks, obtained from a Bootstrapping Service Function. The context parameters may be determined in communication with the web server having a Network Application Function.

According to another aspect, a method is provided in a web server for enabling safe communication with a client terminal. In this method, the web server sends a web page to the client terminal in a session with the client terminal, and receives a login request from the client terminal indicating a context-specific key, Ks_NAF', created by the client terminal. The web server then determines a set of context parameters, P1, . . . Pn, pertaining to said session and/or web page, and determines a context-specific key, Ks_NAF', based on the context parameters. The web server can then verify the client if the context-specific key determined in the web server matches the context-specific key received from the client terminal.

According to another aspect, a web server is configured to enable safe communication with a client terminal. The web server comprises a sending module adapted to send a web page to the client terminal in a session with the client terminal, and a receiving module adapted to receive a login request from the client terminal indicating a context-specific key, Ks_NAF', created by the client terminal. The web server also comprises a verification module adapted to determine a set of context parameters, P1, . . . Pn, pertaining to said session and/or web page, determine a context-specific key, Ks_NAF', based on the context parameters, and to verify the client if the context-specific key determined in the web server matches the context-specific key received from the client terminal.

The above method and web server may be configured and implemented according to different optional embodiments. In one possible embodiment, the context parameters include at least one of: a path component of a Universal Resource Locator of the web page, a current HTTP session identity of the session, and a current TLS/SSL session identity of the session. As in the above client terminal, the context-specific key Ks_NAF' may be created by applying a predefined Key Derivation Function, KDF, to the context parameters, the Key Derivation Function thus being known to the client terminal. In that case, an aggregated parameter, S, may be created based on the context parameters P1, . . . Pn in a predetermined manner, and the Key Derivation Function may be applied using as input the aggregated parameter S and an application specific key, Ks_NAF, such that
Ks_NAF'=KDF(Ks_NAF, S(P1, . . . Pn)).

The application specific key Ks_NAF may be obtained from a Bootstrapping Service Function associated with the client terminal.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
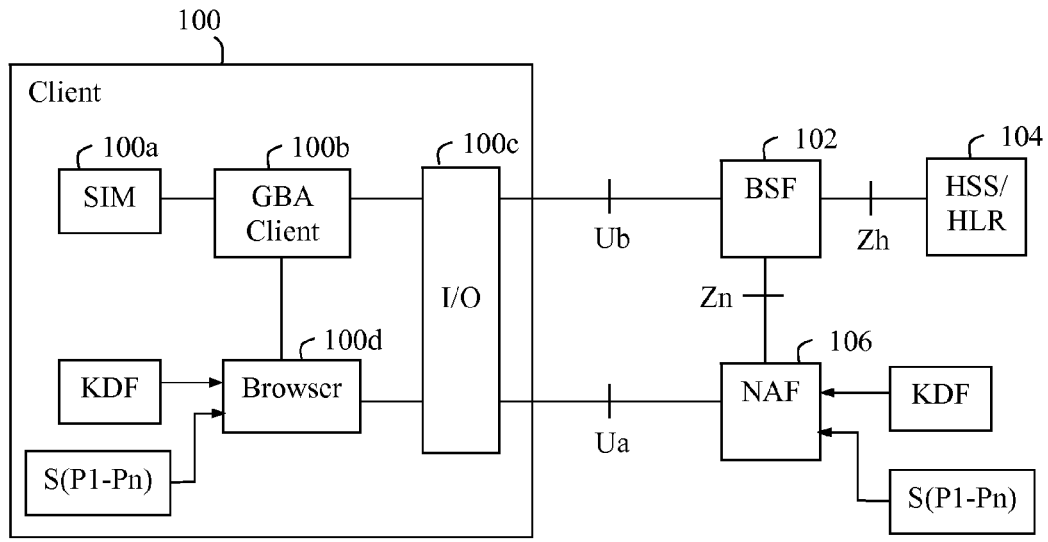
FIG. 1 is a block diagram illustrating a communication scenario for verifying a client, according to some possible embodiments.

Even if a code injection attack as such is not prevented from occurring as outlined above, a solution is now suggested to limit the resulting damage of the attack by configuring a function such as a GBA JavaScript API at a client terminal in a novel manner as follows. The damage that may be caused when a secret key is exposed when accessing a web page, e.g. in the above-described manner, can be avoided by ensuring that the secret key returned by the JavaScript API at the client is context-specific and effectively useless, i.e. invalid, for authentication or verification in another context. This may be accomplished by binding the above key Ks_NAF to one or more of: the current web page, current HTTP session, current TLS/SSL session, or any combination thereof. Thereby, a context-specific key is obtained that can be used for authentication of the client in the current context only but not in other contexts or sessions.

To construct the context-specific key, the client terminal may perform the following procedure with actions 2:1-2:4 in order to communicate with a web server having a NAF:

Action 2:1. At some point, the client terminal obtains a master key "Ks" in a bootstrapping communication with a BSF.

Action 2:2. The client terminal derives an application specific NAF key "Ks_NAF" from the master key Ks.

Action 2:3. The client terminal contacts the NAF in the web server and determines a set of n context parameters P1, . . . , Pn using a predefined procedure. Any number n of context parameters may be used for this solution, including n=1.

Action 2:4. The client terminal creates a context-specific key, here denoted Ks_NAF', by applying a predefined "Key Derivation Function" KDF with the Ks_NAF and the context parameters P1, . . . , Pn as input. In one possible embodiment, this operation may be performed such that Ks_NAF'=KDF(Ks_NAF, S(P1, . . . Pn))

where S(P1, . . . Pn) is a parameter created based on the n context parameters P1, . . . , Pn in a predetermined manner. For example, the parameter S may be an octet string containing a concatenation of the context parameters P1, . . . Pn. In this description, the term "Key Derivation Function" is generally used to represent any function that creates the context-specific key with at least the context parameters as input in any manner such that the context-specific key is effectively bound to the context parameters. For example, the Key Derivation Function KDF may be an aggregation of plural functions such that the output from one function is used as input to another function, and so forth.

For example, actions 2:1 and 2:2 may be performed in the same way as in an ordinary GBA procedure while actions 2:3 and 2:4 are performed to obtain the context-specific key. The client terminal can then use the context-specific key for proper authentication towards the web server. In this process, the web server can determine the context-specific key in the same manner, i.e. using the same context parameters P1, . . . , Pn and KDF, and thus verify the key when received from the client terminal. The client terminal uses the created context-specific key Ks_NAF' for verification by indicating it to the web server in a suitable manner. For example, the Ks_NAF' as such, or a representation thereof such as an authentication token associated with the context-specific key Ks_NAF', may be sent to the web server in a login request which initiates the authentication procedure in the web server. In either case, the login request basically indicates the created context-specific key Ks_NAF'.

In FIG. 1, an architecture for using GBA in a browser of a client is illustrated which may be employed for the solution described here. In this figure, a client terminal 100 comprises a Subscriber Identity Module, SIM, 100a and a GBA client 100b which can communicate with a BSF 102 over a Ub interface and using an input/output unit "I/O" 100c. The BSF 102 has access to client information in a Home Subscriber Server (HSS) or Home Location Register (HLR) entity 104 over a Zh interface. The SIM 100a contains identity information of the client.

The client terminal 100 also comprises a browser 100d which can communicate with a NAF of a web server 106 over a Ua interface and using the input/output unit I/O 100c. As indicated in the figure, both the client terminal 100 and the NAF in web server 106 are configured with the above-described KDF and parameter S(P1, . . . Pn) which are thus known to both parties which can create and determine the same context-specific key Ks_NAF' therefrom. Further, The NAF in web server 106 has access to client information from the BSF 102 over a Zn interface. Depending on the implementation, the context-specific key Ks_NAF' may be created in the client terminal 100 by the browser 100d or by a separate functional block, not shown, that is connected thereto. In the following description, the term "client" or "client terminal" may refer to any suitable functional unit for performing the described actions and functions in the client terminal.

Figure 3:
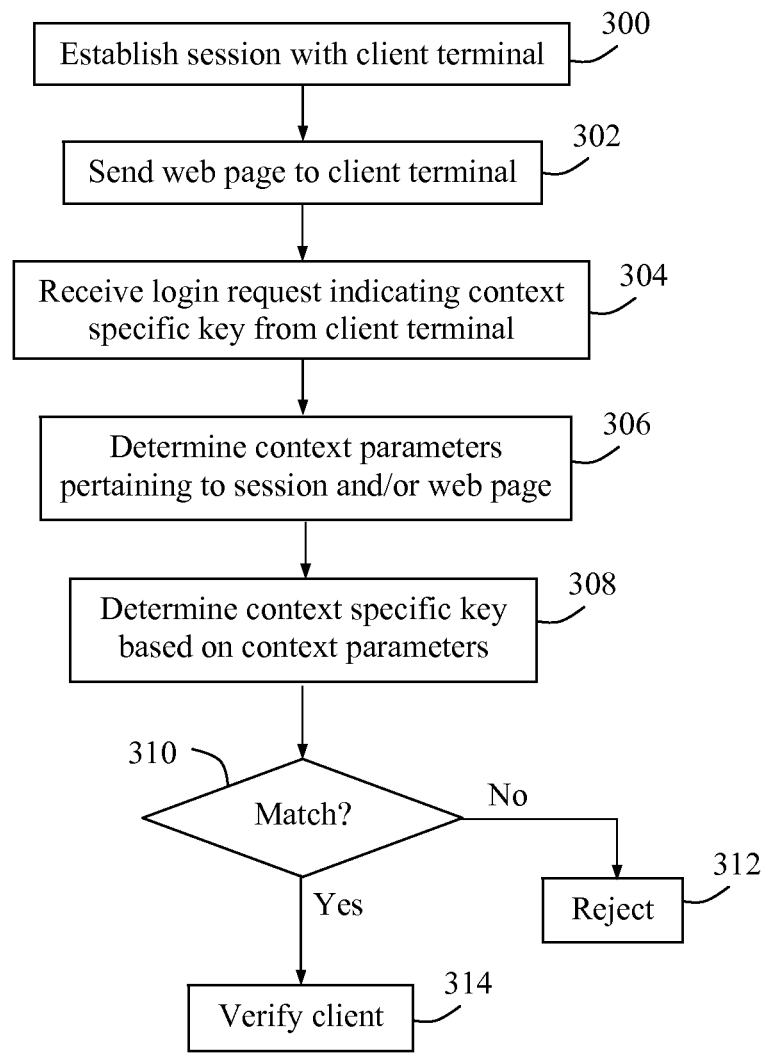
FIG. 3 is a flow chart illustrating a procedure in a web server, according to further possible embodiments.

A procedure executed in a client terminal for enabling safe communication with a web server, will now be described with reference to the flow chart in FIG. 3. This procedure may be applied in the client terminal 100 described for FIG. 1 above. In a first action 200, the client terminal establishes a session with the web server, e.g. over the public Internet or an intranet. In this session, the client terminal obtains a web page from the server as shown in a next action 202.

The client terminal then determines a set of context parameters, P1, . . . Pn, pertaining to the ongoing session and/or the obtained web page, in a further action 204. For example, the context parameters may be any number of parameters including at least one of: a path component of a Universal Resource Locator (URL) of the web page, a current HTTP session identity of the session, and a current TLS/SSL session identity of the session, which will be described in more detail later below.

In a next action 206, the client terminal creates a context-specific key, Ks_NAF', based on the above determined context parameters. For example, the Ks_NAF' may be created by applying a predefined Key Derivation Function, KDF, to the context parameters, the Key Derivation Function being known to the web server as well. As mentioned above, the KDF may be a single function or aggregated from plural functions. Further, an aggregated parameter, S(P1, . . . Pn), may be created based on the context parameters P1, . . . Pn in a predetermined manner, and the Key Derivation Function may be applied using the aggregated parameter S(P1, . . . Pn) and an application specific key, Ks_NAF as input, such that Ks_NAF'=KDF(Ks_NAF, S(P1, . . . Pn)).

Further, the client terminal may have derived the application specific key Ks_NAF from a master key, Ks, obtained from a BSF, such as the BSF 102 shown in FIG. 1. the client terminal may also determine the context parameters in communication with a NAF in the web server e.g. for obtaining session information to be used as context parameters.

A final action 208 illustrates that the client terminal uses the created context-specific key Ks_NAF' for verification of the client in the web server, e.g. by sending to the web server a login request that indicates the created context-specific key Ks_NAF' by including the context-specific key as such or a representation thereof. Thereby, the web server is able to verify the client if a context-specific key determined in the web server matches the context-specific key indicated by the client terminal, which will be described in the next figure.

A procedure executed in a web server for enabling safe communication with a client terminal, will now be described with reference to the flow chart in FIG. 3. This procedure may be applied in the web server 106 described for FIG. 1 above, and/or in combination with the procedure of FIG. 2. In a first action 300, the web server establishes a session with the client terminal, which corresponds to action 200 above. In a next action 302, the server sends a web page to the client terminal during the session, which corresponds to action 202 above.

At some point in the session, the web server receives a login request from the client terminal, in a next action 304, where a context-specific key, Ks_NAF', created by the client terminal, is indicated in the login request. This action thus corresponds to action 208 above. The web server then determines a set of context parameters, P1, ... Pn, pertaining to the present session and/or the above web page, in an action 306, and determines a context-specific key, Ks_NAF', based on the above determined context parameters, in another action 308.

Figure 2:
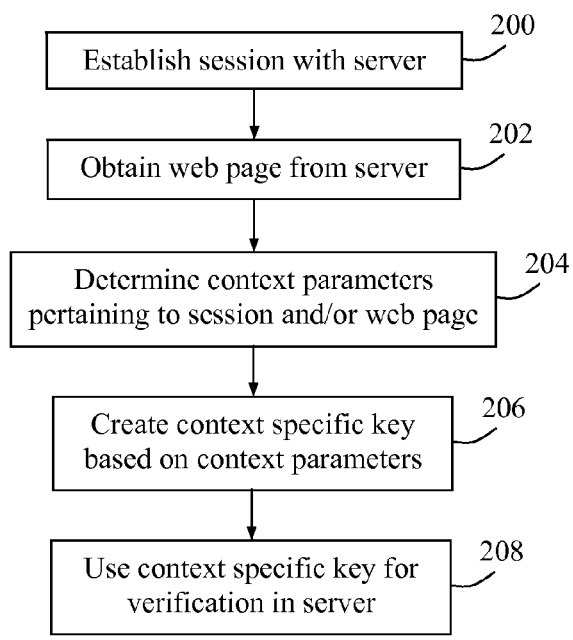
FIG. 2 is a flow chart illustrating a procedure in a client terminal, according to further possible embodiments.

Actions 306 and 308 are performed in the same way as the terminal performed actions 204 and 206 described for FIG. 2 above, and the resulting context-specific key should therefore be the same in both the terminal and the server. In a next action 310, the web server checks if the key received in the login request of action 304 matches the key determined in action 306. If not, the client terminal is deemed to be unreliable and the login request is rejected in an action 312. On the other hand, if the keys do match, i.e. the key Ks_NAF' determined by the web server corresponds to the key Ks_NAF' created by the client terminal, the client is reliable and can be verified in an action 314.

Figure 4:
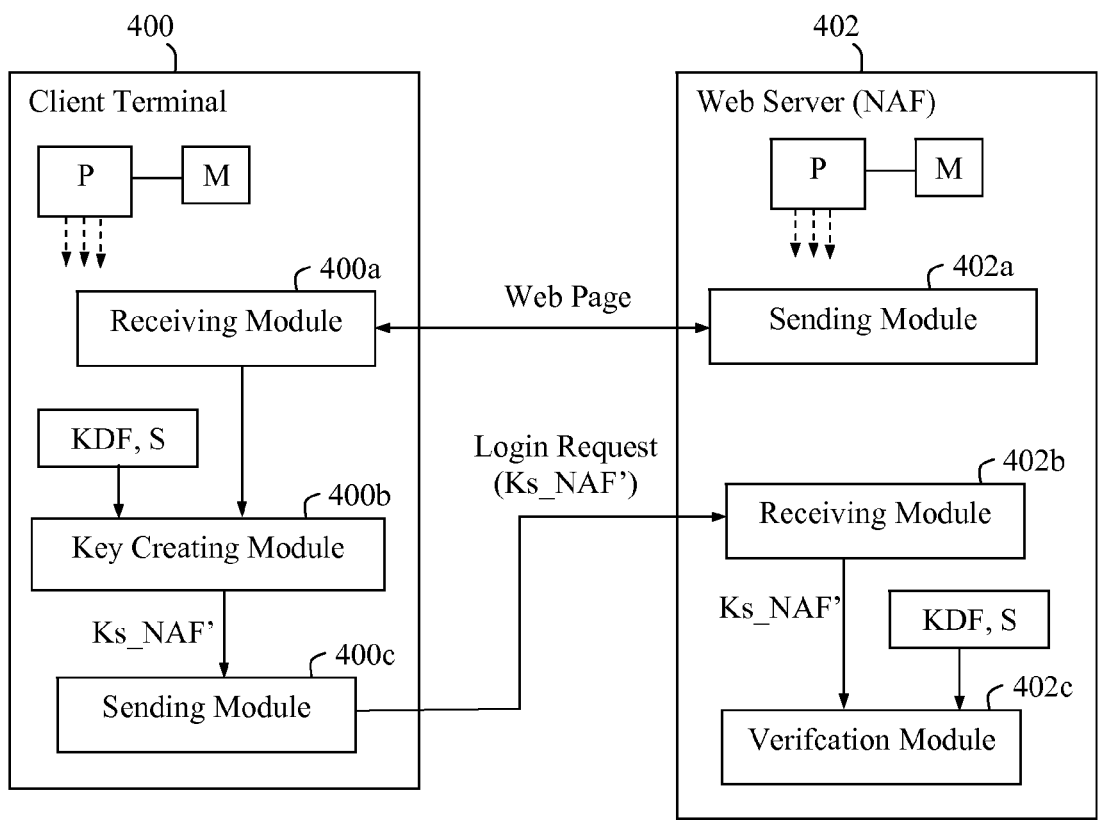
FIG. 4 is a block diagram illustrating a client terminal and a web server in more detail, according to further possible embodiments.

FIG. 4 is a block diagram that illustrates a client terminal 400 and a web server 402 configured to employ the above-described solution according to another illustrative but non-limiting example. The web server 402 has also a NAF implemented. The client terminal 400 and the web server 402 may be configured to act as follows.

A receiving module 400a in client terminal 400 is adapted to obtain or download a web page from a sending module 402a in server 402 during a session. The web page may be a login page. A key creating module 400b in client terminal 400 is adapted to determine a set of n context parameters P1, ... Pn pertaining to the present session and/or the obtained web page. The context parameters may be determined by using a predefined procedure configured in the client.

The key creating module 400b is further adapted to create a context-specific key Ks_NAF' by applying a KDF, and optionally an aggregated parameter S(P1, ... Pn), e.g. as described above, at least to said set of context parameters. In more detail, the aggregated parameter S is created based on the context parameters P1, ... Pn in a predetermined manner, and the Key Derivation Function is applied using as input the aggregated parameter S(P1, ... Pn) and optionally also an application specific key, Ks_NAF, as also described above for FIG. 2.

A sending module 400c in client terminal 400 is adapted to send a login request, indicating the created context-specific key, to a receiving module 402b in server 402. As mentioned above, the context-specific key may be indicated in the login request by including the Ks_NAF' as such or a representation thereof, such as an authentication token associated with the context-specific key, in the login request.

In response thereto, a verification module 402c in server 402 is adapted to determine a context-specific key for the client, which can be done by determining the context parameters P1, ... , Pn and applying the KDF, and optionally the aggregated parameter S(P1, ... Pn), at least to the determined context parameters. The verification module 402c is then adapted to verify the client of terminal 400 if the context-specific key determined in the web server 402 matches the context-specific key created by the client terminal 400.

It should be noted that FIG. 4 merely illustrates various functional modules or units in the web server 402 and client terminal 400 in a logical sense, although the skilled person is free to implement these functions in practice using suitable software and hardware means. Thus, this aspect of the solution is generally not limited to the shown structures of the web server 402 and client terminal 400, while their functional modules 402a-c and 400a-c may be configured to operate according to the features described for any of FIGS. 1-3 above, where appropriate.

The functional modules 402a-c and 400a-c described above can be implemented in the web server 402 and client terminal 400, respectively, as program modules of a respective computer program comprising code means which, when run by a processor "P" in each of the web server 402 and client terminal 400 causes them to perform the above-described actions. Each processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in either of the web server 402 and client terminal 400, respectively, in the form of a memory "M" connected to each processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the web server 402 and client terminal 400.

Some possible but non-limiting examples of implementing the solution for a client using a browser in a communication terminal, will now be described in more detail.

The context-specific key may be created as follows, according to some possible embodiments. Instead of returning the shared secret key Ks_NAF to the script, e.g. as of action 1:2 above, the GBA JavaScript API in the browser returns a context-specific key Ks_NAF' that is bound to a predefined set of n context parameters "P1, ... , Pn". The values of those context parameters may be determined by the web server for the present session and/or web page. Unless the context parameters are identical when the context-specific key is created and when it is used, the key Ks_NAF' will be rejected by the web server as invalid if used by a client in another context.

The binding of the context-specific key Ks_NAF' to the context parameters can be done using an additional key derivation function KDF to calculate/create Ks_NAF' as:
Ks_NAF'=KDF(Ks_NAF, S(P1, ... Pn))
where S(P1, ... Pn) is an octet string constructed from the n context parameters, which can be seen as an aggregated parameter.

The aggregation process S for constructing the octet string S(P1, ... Pn) from the n context parameters is thus predefined and has been configured at the client terminal. As mentioned above, some examples of such context parameters P1, ... Pn that may be used for creating the context-specific key in this solution include, but are not limited to, the following:

A path component of a URL (Universal Resource Locator) of the web page.

A Session ID (Identity) cookie or some other HTTP-based cookie sent from the web server to the client terminal, which in this disclosure is referred to as a "HTTP session identity".

A unique value associated with a TLS/SSL session established between the web server and the client terminal, over which the web-page is downloaded, e.g. the TLS/SSL "Session ID", a "master_secret", a "Finished message", or some other random value generated as part of a TLS/SSL connection setup procedure. In this disclosure, this value is referred to as a "TLS/SSL session identity".

It is possible to use only one or two context parameters, i.e. n=1 or n=2, respectively. For example, it is possible to bind the context-specific key to the login page and to the ongoing TLS/SSL session by using the URL path of the login page and the TLS/SSL Session ID currently used for the client.

The key derivation function KDF and the construction of the aggregated parameter S(P1, . . . Pn) may be realized as follows, according to further possible embodiments. Although there may be several possible options for choosing a key derivation function KDF and a construction of S(P1, . . . Pn) for this solution, re-using the KDF and S(P1, . . . Pn) defined in GBA might offer some benefits with respect to implementation.

By way of example, 3GPP specifies the KDF and the construction of S(P1, . . . Pn) generally as:
KDF(key, S(P1, . . . Pn))=HMAC-SHA-256(key, S(P1, . . . Pn))

In this case, the construction of the octet string S(P1, . . . Pn) from the n input parameters is further specified by the following algorithm:
S(P1, . . . Pn)=FC||P1||L1|| . . . ||Pn||Ln
where
FC is a single octet used to distinguish different instances of the algorithm,
P1, . . . Pn are the n input context parameter encodings,
L1, . . . L2 are the lengths of the corresponding input context parameter encodings P1, . . . Pn, and || denotes concatenation.

It should be noted that the indexation of n input parameters used above differs from the indexation of n+1 input parameters used in Appendix B.2 of reference [1]. The above definitions of KDF and S may thus be used for this solution.

Some examples of selecting context parameters for use in this solution will now be described, according to further possible embodiments. As previously mentioned, one of the problems with the existing 3GPP proposal is that the shared secret key returned by the JavaScript API to the client is typically valid across an entire DNS domain, e.g. "naf.com". This can be avoided according to this solution by using a context-specific key instead, as described above.

It will now be described how a context-specific key can be bound to a path component of a web page URL, according to further possible embodiments. Using the above example again where a host "naf.com" has two web-pages "login.html" and "vulnerable.html"., an ordinary key obtained from the web page naf.com/vulnerable.html in a conventional manner can later be used by an attacker to login via naf.com/login.html by means of the above-described malicious script. This threat can be mitigated by binding a context-specific key to the path component of the web server URL, where the context-specific key is calculated from a context parameter "Pi" which is based on the web page URL:
Pi=abs_path
where abs_path is specified in HTTP 1.1.

It will now be described how a context-specific key can be bound to a HTTP session currently used for the client terminal, according to further possible embodiments. Web-servers typically use session IDs to manage the state of a client across HTTP requests. The session ID is stored in the browser and is also included in every request for web pages from the browser—usually in the form of a cookie. Thus, the key can be bound to the current HTTP session by setting a context parameter "Pi" as:
Pi=HTTP Session identity However, different web server languages tend to use different names for the session ID cookie. Examples of names that some programming languages use when naming their cookie include JSESSIONID (JSP), PHPSESSID (PHP), and ASPSESSIONID (Microsoft ASP). This may be handled by including the name in the API function call. Another possible alternative is to use a standardized cookie carrying a copy of the session ID or some other random value.

Preferably, the cookie may be marked as "HTTP-only" in order to prevent any client side-script from modifying or extracting its value. Security may be further improved by marking the cookie as "non-persistent", since a non-persistent cookie is typically stored in browser memory and is deleted upon exit.

It will now be described how a context-specific key can be bound to the TLS/SSL session, according to further possible embodiments. Some known secure sites, e.g. banks etc, use the TLS/SSL Session ID instead of cookies to keep track of sessions with clients. In this case the entire HTTP session, including any HTTP requests and responses between browser and web-server, occur within a single TLS/SSL session.

There are several reasons why web session tracking via TLS/SSL is uncommon, e.g. including:

Some web servers do not support tracking via TLS/SSL (the HTTP layer is largely independent of TLS/SSL layer)

Some larger sites use TLS/SSL offloading for performance reasons. In this case TLS/SSL management is handled by a separate server (with special purpose hardware) in front of the web server.

Browsers do not always behave as expected. Browsers often limit the number of open connections (e.g. max n connections per tab and m connections in total) and handle timeout functions differently.

For web sites that do support tracking via TLS/SSL, binding the key to a TLS/SSL Session ID or master_secret, or to some other session-specific parameter, can be a useful way of limiting the effects of key theft. A context parameter Pi for use in this solution may thus be set as:
Pi=TLS/SSL Session ID/master_secret/other session-specific parameter Using the master_secret or other session-specific parameter instead of the Session ID might be even more secure, but extracting such values may require changes of the TLS/SSL implementation.

A benefit of using a JavaScript API for GBA at the client is that simplicity can be achieved. With such an API prepared, any web application could start using GBA with a minimum of effort.

Among other things, this novel solution may provide the advantage of defending against one of the most common attacks on Internet, namely the above-described injection of malicious script. By returning a key that is context-specific instead of a general/conventional key, a stolen context-specific key becomes effectively useless for the attacker in his other context(s).

Figure 5:
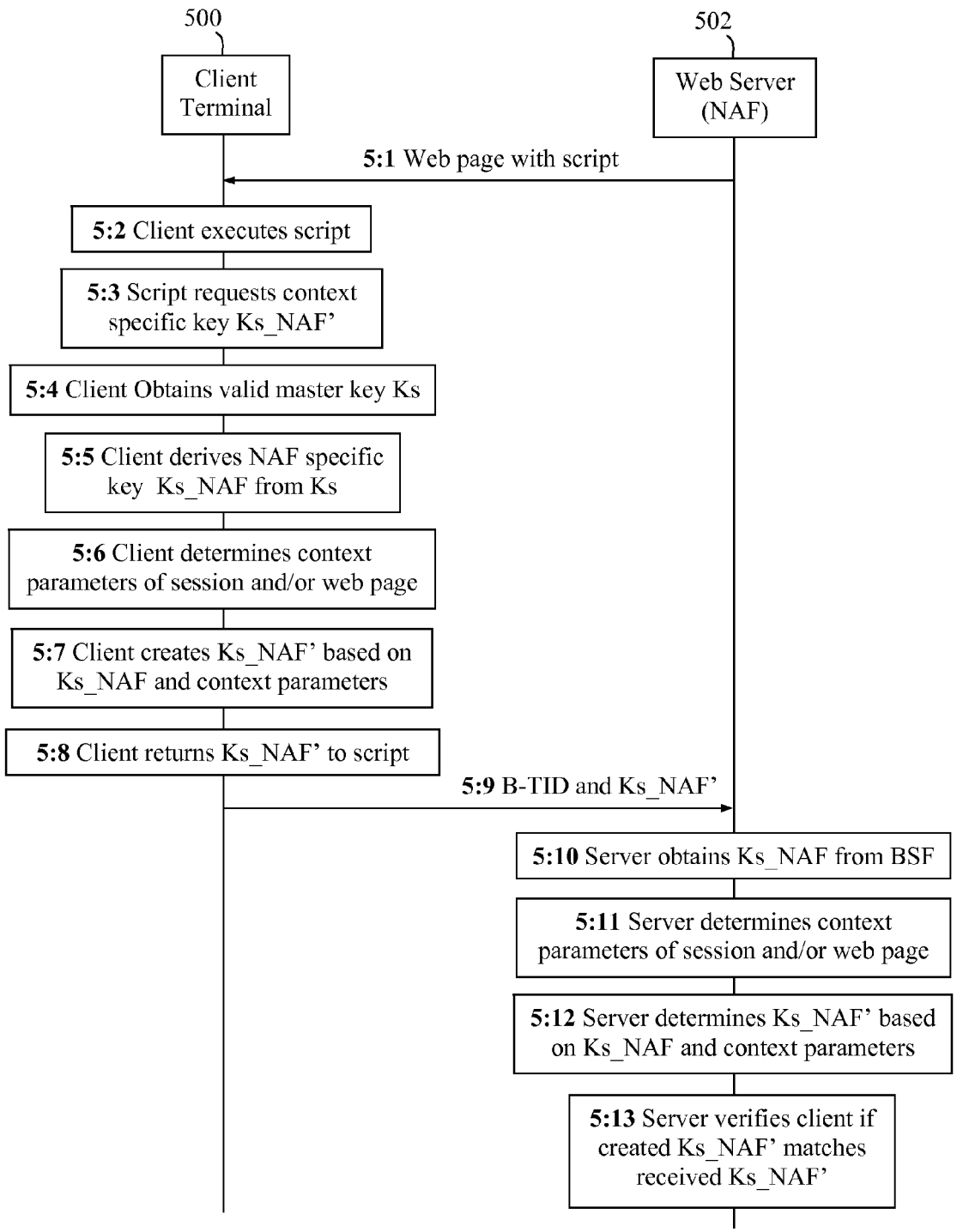
FIG. 5 is a diagram illustrating actions in an example of how a client can be verified in a web server in practice, according to further possible embodiments.

FIG. 5 is a diagram of actions taken by a client terminal and a web server that illustrates another example of employing the above-described solution in a client and a web server (NAF), respectively. This figure thus shows different possible actions involving the client terminal 500 and the web server 502, respectively, which can provide a secure communication between the two nodes based on a proper and reliable verification of the client at the web server 502. This diagram mainly illustrates how the same context-specific key can be created in both nodes as a basis for verification of the client of terminal 500.

A first action 5:1 illustrates that the client terminal 500 obtains a web page containing a script from the web server 502. The terminal 500 then executes the script provided in the web page, in an action 5:2. Thereby, the script requests for a context-specific key Ks_NAF' from the client in an action 5:3, e.g. by calling a GBA API in the terminal 500. In response thereto, the client obtains a valid master key Ks in a next action 5:4. In this action, the client may first check whether a valid master key exists in the terminal that has not expired. If no such valid master key is available, the client will contact a BSF and perform a bootstrapping procedure to obtain a valid master key from the BSF.

In a next action 5:5, the client derives a NAF specific key Ks_NAF from the master key Ks, and determines a set of predefined context parameters in a further action 5:6, basically in the manner described for the above examples. The client is now able to create the requested context-specific key Ks_NAF' based on the above-determined NAF specific key Ks_NAF and predefined context parameters, in a following action 5:7. This process can be performed as described above which will not be repeated here.

In a next action 5:8, the client returns the requested context-specific key Ks_NAF' to the script which then accordingly sends the key Ks_NAF' along with the B-TID parameter to the web server 502 in a further action 5:9. As mentioned above, the B-TID parameter identifies the client, which the server 502 uses for obtaining the NAF specific key Ks_NAF from the BSF in a further action 5:10.

The server 502 is now able to determine the same predefined context parameters in a further action 5:11, and to determine the same context-specific key Ks_NAF' based on the above-determined NAF specific key Ks_NAF and predefined context parameters, in a following action 5:12. The server 502 performs actions 5:11 and 5:12 basically in the same manner as the client performed actions 5:6 and 5:7, thus to provide the same resulting context-specific key Ks_NAF'. Finally, server 502 can verify or authenticate the client in an action 5:13, if the key Ks_NAF' created in action 5:12 matches the key Ks_NAF' received in action 5:9.

The solution according to any of the above-described embodiments and examples enables a client browser and a web server to establish a shared secret key, i.e. the above context-specific key, in an easy and secure manner. Security partly comes from that the key is bound to the particular browsing context which effectively prevents an attacker from stealing a key in one context, e.g., through script injection, and using it in another context. The solution can thus be used with client side scripting and GBA, as described above.

Further, the context-specific key can also be used for other security purposes within the present context and session with the terminal and the web server, such as for encryption of communicated data and messages. Security is provided since no other key can be used in this session/context, such as a key stolen from another context or session.

While the solution has been described with reference to specific exemplary embodiments, the description is generally only intended to illustrate the inventive concept and should not be taken as limiting the scope of the solution. For example, the terms "client terminal", "web server", "context parameters", "context-specific key", "login request" and "Key Derivation Function" have been used throughout this description, although any other corresponding nodes, functions, and/or parameters could also be used having the features and characteristics described here. The solution is defined by the appended claims.

The invention claimed is:

1. A method in a client terminal for enabling safe communication with a web server, the method comprising:
    obtaining a master key in a bootstrapping session with a bootstrapping server,
    obtaining a web page from the web server in a session with the web server,
    determining a set of context parameters pertaining only to said session with the web server,
    obtaining an application-specific key based on said master key;
    creating a context-specific key based on said context parameters and said application-specific key; and
    providing the created context-specific key to a script that is associated with the web page and that indicates the context-specific key to the web server for verification of the client terminal in the web server if a context-specific key determined in the web server matches the context-specific key created by the client terminal.

2. The method according to claim 1, wherein the created context-specific key is indicated in a login request sent to the web server.

3. The method according to claim 1, wherein said context parameters include at least one of: a current HTTP session identity of said session and a current Transport Layer Security (TLS)/Secure Socket Layer (SSL) session identity of said session.

4. The method according to claim 1, wherein the context-specific key is created by applying a predefined Key Derivation Function, KDF, to said context parameters, the Key Derivation Function being known to the web server.

5. The method according to claim 4, wherein an aggregated parameter, S, is created based on the context parameters in a predetermined manner, and wherein the Key Derivation Function is applied using as input said aggregated parameter S and a key, Ks_NAF, such that
    Ks_NAF'=KDF(Ks_NAF, S(P1, . . . Pn)), where Ks_NAF' is the created context-specific key, KS_NAF is the application-specific key, and P1, . . . Pn is the set of context parameters.

6. The method according to claim 5, wherein the application specific key Ks_NAF has been derived from a key, Ks, obtained from a Bootstrapping Service Function, BSF, where Ks is said master key.

7. The method according to claim 1, wherein the context parameters are determined in communication with the web server having a Network Application Function, NAF.

8. The method of claim 1, wherein said context parameters include at least one of: a current HTTP session identity of said session, a current Transport Layer Security (TLS)/Secure Socket Layer (SSL) "Session ID" for said session, a "master_secret" generated as part of a TLS/SSL connection setup procedure for said session, and a "Finished message" generated as part of a TLS/SSL connection setup procedure for said session.

9. A client terminal configured to enable safe communication with a web server, the client terminal comprising:
    a processor and a memory, said memory containing code executable by said processor whereby said client terminal is configured to:
    obtain a master key in a bootstrapping session with a bootstrapping server and obtain a web page from the web server in a session with the web server,
    determine a set of context parameters pertaining only to said session with the web server, obtain an application-specific key based on said master key, and create a context-specific key based on said context parameters and said application-specific key; and provide the context-specific key to a script that is associated with the web page, that is executed by the client terminal, and that sends a login request indicating the context-specific key to the web server, to enable verification of the client terminal if a context-specific key determined in the web server matches the context-specific key created by the client terminal.

10. The client terminal according to claim 9, wherein said memory contains code executable by said processor whereby said client terminal is configured to create the context-specific key by applying a predefined Key Derivation Function, KDF, to said context parameters, the Key Derivation Function being known to the web server.

11. The client terminal according to claim 10, wherein said memory contains code executable by said processor whereby said client terminal is configured to create an aggregated parameter, S, based on the context parameters in a predetermined manner, and the Key Derivation Function is applied using as input said aggregated parameter S and a key, Ks_NAF, such that Ks_NAF'=KDF(Ks_NAF, S(P1, ... Pn)), where Ks_NAF' is the created context-specific key, KS_NAF is the application-specific key, and P1, ... Pn is the set of context parameters.

12. The client terminal according to claim 9, wherein said memory contains code executable by said processor whereby said client terminal is configured to determine the context parameters in communication with the web server having a Network Application Function, NAF.

13. The client terminal of claim 9, wherein said context parameters include at least one of: a current HTTP session identity of said session, a current Transport Layer Security (TLS)/Secure Socket Layer (SSL) "Session ID" for said session, a "master_secret" generated as part of a TLS/SSL connection setup procedure for said session, and a "Finished message" generated as part of a TLS/SSL connection setup procedure for said session.

14. A method in a web server for enabling safe communication with a client terminal, the method comprising:

sending a web page to the client terminal in a session with the client terminal, receiving a login request from a script that is associated with the web page and that is executed by the client terminal indicating a context-specific key created by the client terminal, obtaining a first key from a bootstrapping server, determining a set of context parameters pertaining only to said session with the client terminal, determining a context-specific key based on said context parameters and said first key, and verifying the client terminal if the context-specific key determined in the web server matches the context-specific key created by the client terminal.

15. The method according to claim 14, wherein said context parameters include at least one of: a current HTTP session identity of said session and a current Transport Layer Security (TLS)/Secure Socket Layer (SSL) session identity of said session.

16. The method according to claim 14, wherein the context-specific key is created by applying a predefined Key Derivation Function, KDF, to said context parameters, the Key Derivation Function being known to the client terminal.

17. The method according to claim 16, wherein an aggregated parameter, S, is created based on the context parameters in a predetermined manner, and the Key Derivation Function is applied using as input said aggregated parameter S and an application specific key, Ks_NAF, such that Ks_NAF'=KDF(Ks_NAF, S(P1, ... Pn)), where Ks_NAF' is the created context-specific key and P1, ... Pn is the set of context parameters.

18. The method according to claim 17, wherein the application specific key Ks_NAF is obtained from a Bootstrapping Service Function, BSF, associated with the client terminal.

19. A web server configured to enable safe communication with a client terminal, the web server comprising:

a processor and a memory, said memory containing code executable by said processor whereby said web server is configured to:

send a web page to the client terminal in a session with the client terminal, receive a login request from a script that is associated with the web page and that is executed by the client terminal indicating a context-specific key created by the client terminal, obtain a first key from a bootstrapping server, determine a set of context parameters pertaining only to said session with the client terminal, determine a context-specific key based on said context parameters and said first key, and verify the client if the context-specific key determined in the web server matches the context-specific key created by the client terminal.

20. The web server according to claim 19, wherein said memory contains code executable by said processor whereby said web server is configured create the context-specific key by applying a predefined Key Derivation Function, KDF, to said context parameters, the Key Derivation Function being known to the client terminal.

21. The web server according to claim 20, wherein said memory contains code executable by said processor whereby said web server is configured to create an aggregated parameter, S, based on the context parameters in a predetermined manner, and to apply the Key Derivation Function using as input said aggregated parameter S and an application specific key, Ks_NAF, such that Ks_NAF'=KDF(Ks_NAF, S(P1, ... Pn)), where Ks_NAF' is the created context-specific key and P1, ... Pn is the set of context parameters.

22. The web server according to claim 21, wherein said memory contains code executable by said processor whereby said web server is configured to obtain the application specific key Ks_NAF from a Bootstrapping Service Function, BSF, associated with the client terminal.

* * * * *

UNITED STATES PATENT AND TRADEMARK OFFICE
CERTIFICATE OF CORRECTION

PATENT NO.        : 8,903,095 B2                                           Page 1 of 1
APPLICATION NO.   : 13/177385
DATED             : December 2, 2014
INVENTOR(S)       : Norrman et al.

It is certified that error appears in the above-identified patent and that said Letters Patent is hereby corrected as shown below:

On the title page, item (75), under "Inventors", in Column 1, Line 3, delete "Okcar" and insert -- Oscar --, therefor.

In the specification,

In Column 2, Line 35, delete "(B-TID, Ks_NAF)=window.document.getGBAKey( )." and insert -- (B-TID, Ks_NAF)=window.document.getGBAKey( ); --, therefor.

In the claims,

In Column 14, Line 40, in Claim 20, delete "configured" and insert -- configured to --, therefor.

Signed and Sealed this
Fifteenth Day of March, 2016

Michelle K. Lee
*Director of the United States Patent and Trademark Office*